UNITED STATES PATENT OFFICE.

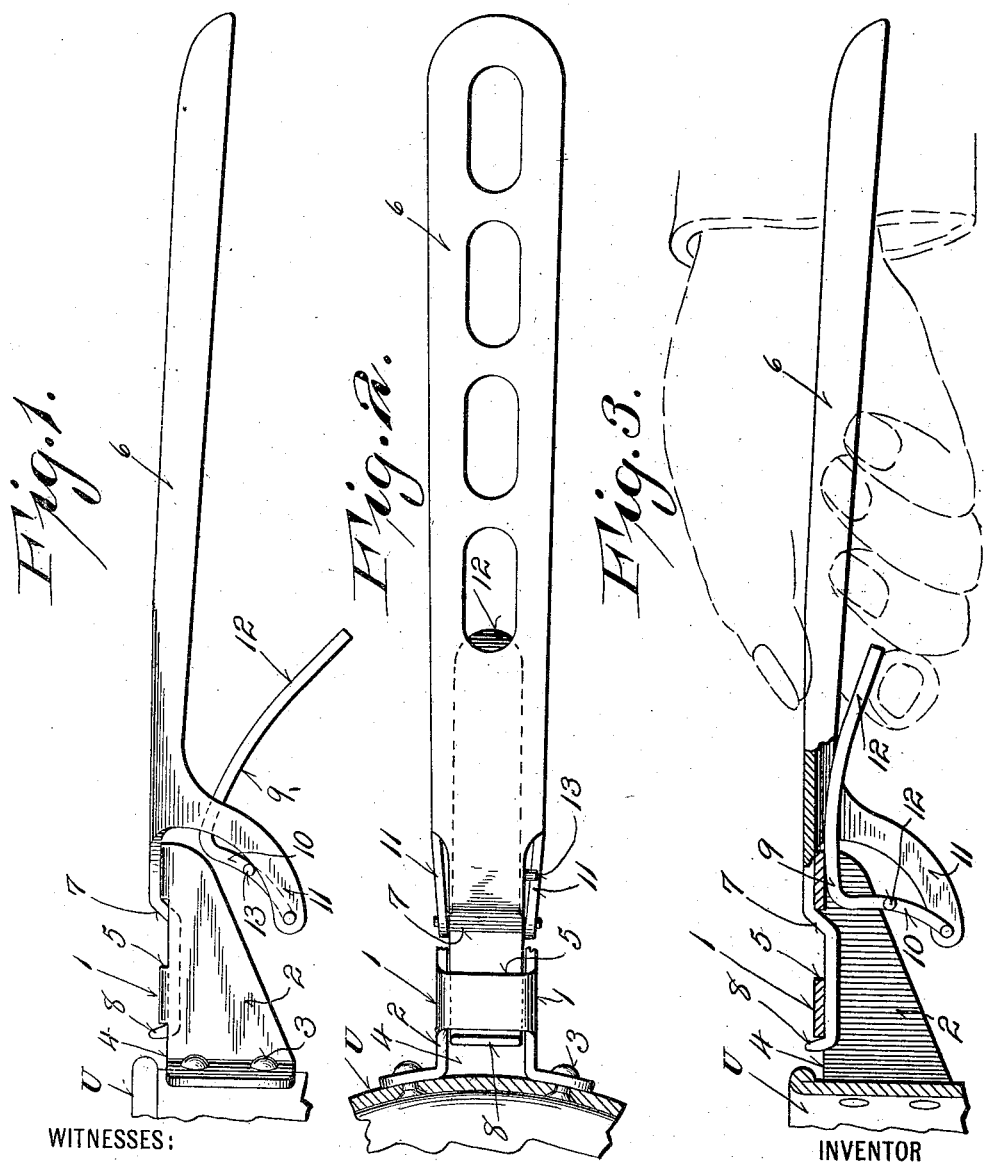

ANTON A. BORSSE, OF SHEBOYGAN, WISCONSIN.

DETACHABLE UTENSIL-HANDLE.

1,277,182.   Specification of Letters Patent.   Patented Aug. 27, 1918.

Application filed March 11, 1918. Serial No. 221,740.

*To all whom it may concern:*

Be it known that I, ANTON A. BORSSE, a citizen of the United States, and resident of Sheboygan, in the county of Sheboygan and State of Wisconsin, have invented certain new and useful Improvements in Detachable Utensil-Handles; and I do hereby declare that the following is a full, clear, and exact description thereof.

The present invention relates to utensil handles of the same general class as that illustrated in my co-pending patent application Serial No. 205989.

The invention is adapted to be used especially in connection with utensils which are designed to be heated. In other words to provide such utensils with detachable handles, all danger of the user's hands being burnt is eliminated. The object of the present device is to provide a handle which can be very quickly attached to or detached from a utensil.

With this general object in view the invention resides in the improved features of construction and arrangement of parts which will be hereinafter more particularly described and claimed and shown in the drawing in which:

Figure 1 represents a side elevational view of my improved handle attached to a portion of a utensil.

Fig. 2 is a plan view of the structure shown in Fig. 1, certain parts of the utensil being broken away and in section, and Fig. 3 is a vertical sectional view through a portion of a utensil and the adjacent parts of my invention.

The utensil U to which my improved detachable handle is applied, is of conventional design, but is preferably provided with an ear or the like 1 that extends from the side wall of the same adjacent its top edge. Said ear comprises a transversely slotted plate disposed horizontally with respect to the utensil and provided with depending attaching and reinforcing flanges 2, the free ends of which are bent laterally in opposite directions and riveted or otherwise secured as at 3 to the wall of said utensil. This attaching member is thus substantially inverted U-shape in cross section and the base portion that forms the ear proper is provided with slots or openings 4 and 5, the former being adjacent the wall of the utensil and the latter substantially midway the ends of said base portion.

As in said co-pending application above referred to, my improved handle 6 is provided at one end with an attaching portion for coöperating with the ear 1, the said attaching portion being transversely offset as at 7 and has its free end bent laterally or provided with a lug 8. The shoulders formed by the offset portion 7 and the lug 8 are such a distance apart as to cause the former to engage the outer wall of the slot 5 and the latter to contact with the outer wall of the slot 4 when said offset portion is disposed through said slot 5 and arranged as shown in the figures of the drawing. The offset portion will thus engage the under side of the ear and the handle 6 adjacent said offset portion will engage the upper surface of the ear.

This engagement between the handle and the attaching ear will permit the utensil to be readily lifted and carried from place to place. When, however, it is necessary to invert the utensil or otherwise subject it to unusual usage, a pivoted retaining member 9 is brought into operation. This member is substantially in the form of a right angular plate pivoted at the end of one arm 10 between a pair of ears 11 which depend from and are formed integrally with the handle 6. The other arm 12 of the member 9 is considerably longer than the first mentioned arm whereby to provide a finger piece as shown in Fig. 3.

Normally the weight of the arm 12 causes the member 9 to be spaced from the handle 6, for instance when the attaching portion of the handle is being engaged with the ear 1. But when the ear is to be removably connected with the handle, the retaining member 9 is moved as best shown in Fig. 3 to engage the inner end portion of the arm 12 with the under side of the base portion forming the ear proper. Release of the finger piece will automatically cause the disengagement of the retaining member and the ear as is obvious. A stop lug 13 projecting from one side of the arm 10 is adapted to engage one of the ears 11 to limit movement of the retaining member away from the handle 6.

From the foregoing description taken in connection with the accompanying drawing it will be evident that this improved handle may be very quickly and effectively attached to a utensil, and also that the disconnection of the parts may also be readily accomplished. This is due to the ease of manipulation of the retaining member 9.

I claim:

1. A device of the class described comprising a handle having one end offset for interlocking engagement in a portion of an article to be carried, an ear depending from the handle and having its free end portion laterally directed toward the offset portion of the handle, and an angular retaining member pivoted at one end to the ear, one arm of said retaining member extending inwardly of the handle to form a finger piece.

2. A device of the class described comprising a handle having one end offset for interlocking engagement in a portion of an article to be carried, an ear depending from the handle and having its free end portion laterally directed toward the offset portion of the handle, an angular retaining member pivoted at one end to the ear, one arm of said retaining member extending inwardly of the handle to form a finger piece, and a laterally directed stop on the retaining member engageable with the ear to prevent pivotal movement of the retaining member in one direction.

3. A device of the class described comprising a handle having one end adapted to engage an article to be lifted, an ear on the handle, and a substantially right angular retaining member pivoted at one end to said ear, one arm of the retaining member being adapted to grip said article between the same and the handle.

4. The combination with a slotted ear, of a handle having one end portion offset with respect to the other part, the free end of said offset portion being turned laterally, said offset portion being disposed through the slotted ear, said laterally turned end being engaged with one wall of one of the slots, a retaining member pivoted to the handle adjacent the offset portion, and a finger piece on the retaining member adapted to move the latter to grip said ear between the same and the handle.

In testimony that I claim the foregoing I have hereunto set my hand at Sheboygan, in the county of Sheboygan, and State of Wisconsin.

ANTON A. BORSSE.

Copies of this patent may be obtained for five cents each, by addressing the "Commissioner of Patents, Washington, D. C."